Figure 1:
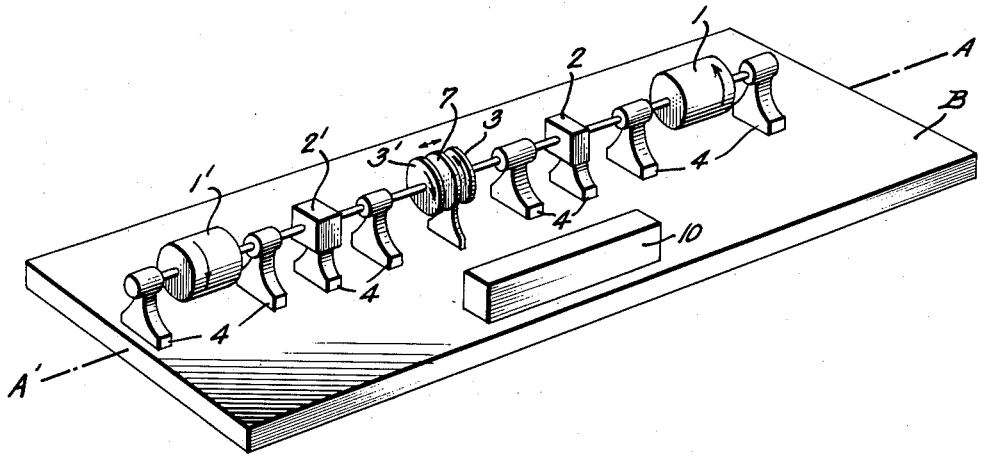

Feb. 14, 1956 J. P. PAINE 2,734,383
METHOD OF AND APPARATUS FOR CONTROLLING
THE ANGULAR MOVEMENT OF A BODY
Filed Nov. 20, 1952

INVENTOR
JOSEPH P. PAINE

BY
ATTORNEY

United States Patent Office 2,734,383
Patented Feb. 14, 1956

2,734,383

METHOD OF AND APPARATUS FOR CONTROLLING THE ANGULAR MOVEMENT OF A BODY

Joseph P. Paine, Baltimore, Md., assignor to Aircraft Armaments, Inc., Baltimore, Md., a corporation of Maryland Application November 20, 1952, Serial No. 321,709

8 Claims. (Cl. 74—1)

This invention relates to a method of and apparatus for controlling the angular movement of a body and particularly an unrestrained body in roll.

It is the object of the present invention to provide a rugged and reliable system for imposing an effective control upon a free body in space by means of kinetic energy carried by the body.

It is a further object of the invention to provide a simple self-operating control system of few parts capable of storing an adequate amount of control energy in a small space.

It is a further object of the invention to provide a control system for kinetic energy produced by rotary masses which lends itself to transmission to the controlled body by means of mechanical, electrical, magnetic, fluid pressure controls or combinations of such.

It is another object of the invention to provide a system for the control of a free body in space, such as a rocket, torpedo, guided missile or similar body having no external control surfaces, in a manner to accomplish the function usually performed by means of airfoils or jets. The control is imposed by rotary kinetic energy which is either generated on the body while the same is in movement or flight, or which is set in motion before the body is launched in preparation for utilization as a control force should the need therefor arise.

It is another object of the invention to utilize rotary kinetic energy generated by a rotating mass such as a small flywheel rotating at high speed, which may be converted by reduction gearing to energy of low speed and great force to transmit a torque to a body which exerts a control thereon, in response to a sensing means controlled by a predetermined movement of the body indicating a need for such control.

The invention proceeds upon the principle of controlling the angular movement of a body around a predetermined axis thereof by arranging a pair of sources of rotary kinetic energy on the body, which sources rotate in opposite directions on a common axis in parallel to the predetermined axis of the body. When the body experiences a deviation in its course or flight, necessitating a corrective control therefor, the sensing means carried by the body serves to selectively couple one of the sources of kinetic energy to the body, which transmits a torque to the body in a direction to impose the desired corrective influece thereon. The extent of the energy imposed upon the body may be governed by a translation of the kinetic energy represented by a small mass moving at high speed through reduction gearing which serves to translate the kinetic energy to a large force acting at a low speed. If desired, the sensing means may be arranged remotely from the body and the control impulse may be transmitted to the body by radiant energy.

Figure 2:
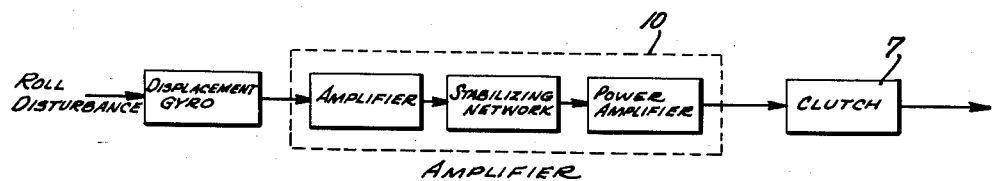

Other objects and purposes will appear from the detailed description of the invention following hereinafter, taken in conjunction with the accompanying drawing, wherein Fig. 1 is a schematic layout of a preferred embodiment of the apparatus to attain the results of the invention; and Fig. 2 is a schematic circuit showing the sensing means for executing the desired control on the body.

In Fig. 1 is shown the platform B of the body which may assume the form of a rocket, a gimbaled platform, a guided missile or the like, which it is desired to orient along the axis A, A'. On the body is mounted for rotation along a common axis a pair of rotors 1, 1', which operate at high speed in opposite directions. The common rotary axis of rotors 1, 1' which are mounted in bearings 4 mounted on the body B is parallel to the axis A, A'. These rotors may be driven by electric motors, air jets or other means, and these prime movers may be either carried by the body, or the rotor may be brought up to a desired speed by detachable prime movers. When the rotors have reached their normal operating speed the driving power may or may not be removed, depending upon the cycle of duty required of the device. Thus, the desired control may be of a "one shot" nature so that it is satisfactory that the rotors come to rest after their controlling function has been performed and the rotary kinetic energy in the rotors 1, 1' has been expended. On the other hand, if the rotors are driven continuously the control effects may be imposed repeatedly as the need therefor arises.

The rotors 1 and 1' are coupled to reduction gears 2 and 2', respectively, and the mechanical transmission from these reduction gears extends to clutch plates 3 and 3', respectively. Between the rotary clutch plates 3 and 3' is disposed a central clutch plate or disc 7 which is fixedly attached to the body B but which may be moved laterally under the control of the sensing means to couple the disc 7 to either the clutch plate 3 or 3'. The engagement of disc 7 with either clutch plate serves to transmit a torque from the respective plate 3 or 3' by producing an angular deceleration of the rotor 1 or 1'. For example, if the disc 7 is moved to the right so that the same is in engagement with clutch plate 3, a torque is produced on the body B in one direction, whereas if the disc 7 is moved to the left and comes in contact with the disc plate 3', a torque is transmitted to the body B in the opposite direction.

While the clutch in the illustrated embodiment of the invention is shown as a disc type clutch, any type of clutch may be used such as cone, pneumatic, magnetic, or fluid magnetic consisting of powdered iron in a liquid medium. It is highly desirable, although not absolutely necessary, to have the clutch characteristic such that the output torque is proportional to the input signal of the clutch.

The clutch is controlled through a sensing device and suitable auxiliary control circuits which are preferably mounted on the control body. These controls are housed in container 10 and may include a rate or position sensitive device such as a gyroscope, a potentiometer, or a mechanical position measuring device. These elements are indicated in greater detail in Fig. 2. For example, the displacement gyroscope on the body senses a disturbance in the roll angle of the body from the desired value, whereupon the gyroscope pickoff transmits this signal to an amplifier which may be electrical, electromagnetic, mechanical, hydraulic or pneumatic. The amplified signal passes through a stabilizing network to impart necessary stability to the system so that the same will not operate by transient or stray effects, which stabilizing systems are well known in the art. The stabilized signals thereafter pass through a power amplifier in order to impose the desired control upon the movable member 7 of the clutch assembly.

As explained above, the kinetic energy of either rotor, as transmitted through its respective reduction gear, is coupled to the body by means of the clutch which serves to decelerate the respective rotor. Thus, the energy removed from the rotor performs work on the controlled body. The limit of the control which is available is determined by the angular momentum of the rotor and the work necessary to maintain the control for a predetermined length of time.

The reduction gears 2 and 2' serve as torque and inertia amplifiers since the inertia of the rotor as viewed from the body becomes $I_R N^2$ where $I_R$ is the rotor inertia and N is the ratio of the gear box. The torque on the rotor produced by the clutch becomes $T_C/N$ where $T_C$ represents the clutch torque.

Thus, as explained above, the system is characterized by a high degree of simplicity by virtue of its few moving parts which is capable of producing relatively high controlling torques without large energy input to the system. This results from the energy storage characteristics of the spinning rotors.

The system becomes inoperative as soon as the rotors have come to rest, which is highly desirable in certain "one-shot" control systems.

In accordance with the invention a body may be controlled with no external forces or action, such as by jets or airfoils, which is highly desirable in some cases.

While the spinning rotors have been illustrated in the preferred embodiment of the invention as being arranged co-axially, the system is operative when the axes of the rotors are merely parallel in order to develop the proper moments.

While I have described my invention as embodied in a specific form and as operating in a specific manner for purpose of illustration, it should be understood that I do not limit my invention thereto, since various modifications will suggest themselves to those skilled in the art without departing from the spirit of my invention, the scope of which is set forth in the annexed claims.

I claim:

1. The method of controlling an unrestrained body in roll which comprises affixing to the body a pair of sources of rotary kinetic energy rotating in opposite directions and on axes parallel to the axis of roll of said body, and selectively coupling only one of said sources of energy to said body at a time in response to a predetermined roll of said body to expand at least part of the kinetic energy of said one source on said body and thereby to exert a corrective roll control thereon.

2. The method of controlling the angular rolling movement of a free body in space around a predetermined axis of said body which comprises mounting a pair of sources of rotary kinetic energy rotating in opposite directions on axes parallel to said first-mentioned axis, and selectively coupling only one of said sources of energy to said body in response to a predetermined angular variation in said body to transmit at least part of the kinetic energy at a time of said one source to said body and thereby to exert a corrective control thereon around said first-mentioned axis.

3. The method of controlling the angular rolling movement of a free body in space around a predetermined axis of said body which comprises imparting rapid rotary motion to a pair of masses arranged on said body to rotate in opposite directions on axes parallel to said first-mentioned axis, translating by reduction gearings the kinetic energy of said masses to corresponding energy of reduced speed and increased force, and selectively coupling only one of said reduction gearings at a time to said body in response to a predetermined rolling deviation of said body to convert at least part of the kinetic energy of said reduction gearing to a torque on said body in a direction opposite to said rolling deviation to exert a corrective control thereon around said first-mentioned axis.

4. The method of controlling the angular rolling movement of a free body in space around a predetermined axis of said body which comprises mounting a pair of sources of rotary kinetic energy rotating in opposite directions on axes in parallel to said first-mentioned axis, translating by reduction gearings the kinetic energy of said sources to corresponding energy of fractional speed and multiple force, and selectively clutching only one of said sources of energy at a time to said body in response to a predetermined positional variation in said body to transmit at least part of the kinetic energy of said one source to said body and thereby to exert a torque and consequent corrective control thereon around said first-mentioned axis.

5. An apparatus for controlling the angular movement of a body around a predetermined axis thereof, comprising a pair of oppositely rotating masses mounted on said body on axes parallel to said first-mentioned axis, a member fixed to said body, sensing means responsive to a deviation in the angular position of said body, and means controlled by said sensing means for selectively coupling said member to one or the other of said pair of rotating masses depending upon the direction of said deviation to transmit a torque to said body in a direction to counteract said deviation.

6. An apparatus for controlling an unrestrained body in roll around a predetermined axis of roll, comprising a pair of oppositely rotating masses mounted on said body on axes parallel to said axis of roll, reduction gearings terminating in rotary elements for converting the energy of said rotating masses to corresponding energy of low speed and high force, a member fixed to said body, sensing means responsive to a deviation in the angular position of said body and to the direction of said deviation, and means controlled by said sensing means for selectively coupling said member to one or the other of said rotary elements depending on the direction of said deviation to transmit a torque to said body in a direction to counteract said deviation.

7. An apparatus for controlling the angular movement of a body around a predetermined axis thereof, comprising a pair of oppositely rotating masses mounted on said body on a common axis parallel to said first-mentioned axis, reduction gearings terminating in rotary elements for converting the energy of said rotating masses to corresponding energy of low speed and high force, a translatable but non-rotatable member fixed to said body, sensing means responsive to a deviation in the angular position of said body and to the direction of said deviation, and means controlled by said sensing means for laterally moving said member to selectively couple it to one or the other of said rotary elements depending upon the direction of said deviation to transmit a torque to said body in a direction to counteract said deviation.

8. An apparatus as set forth in claim 7 wherein said sensing means is carried by the body and comprises a displacement gyroscope, and amplifying means for the movements thereof between said gyroscope and coupling member.

References Cited in the file of this patent

UNITED STATES PATENTS

| 1,096,253 | Lang | May 12, 1914 |
| 1,232,619 | Sperry | July 10, 1917 |
| 1,545,812 | Chessin | July 14, 1925 |
| 2,162,482 | Hanna | June 13, 1939 |
| 2,469,035 | Gourdon | May 3, 1949 |